July 30, 1957 G. E. HOLLSTROM 2,800,753
DIAMOND CUT-OFF WHEEL
Filed Jan. 27, 1954

INVENTOR
GUNNAR E. HOLLSTROM
BY George Crompton
ATTORNEY

2,800,753
DIAMOND CUT-OFF WHEEL

Gunnar E. Hollstrom, Worcester, Mass., assignor to Norton Company, Worcester, Mass., a corporation of Massachusetts Application January 27, 1954, Serial No. 406,411

2 Claims. (Cl. 51—206)

The invention relates to grinding wheels and more particularly to that class thereof known as cut-off wheels and more specifically to diamond cut-off wheels in which diamond abrasive is bonded with metal bond and the wheel center is made of metal, usually steel.

One object of the invention is to improve the strength of such wheels. Another object is to reduce rejections of such wheels by the manufacturing inspectors. Another object is to reduce the number of failures in use of such wheels.

Other objects will be in part obvious or in part pointed out hereinafter.

Figure 1:
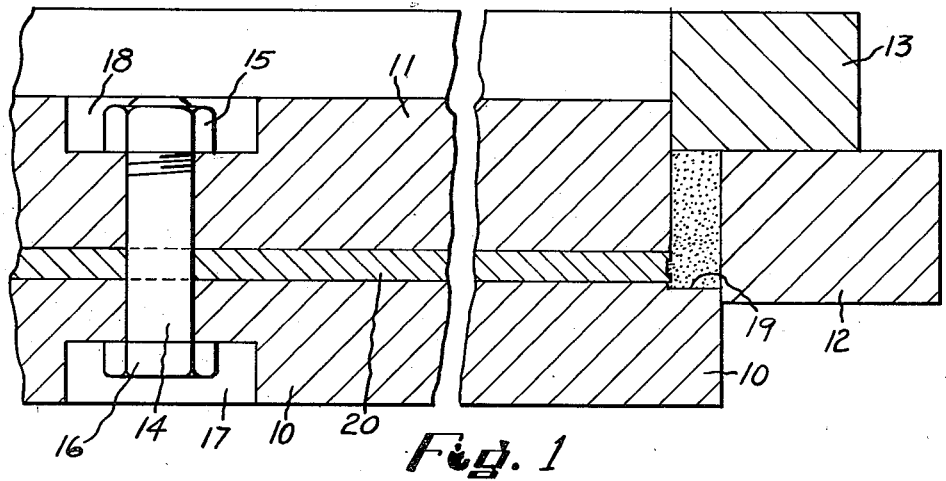
Figure 3:
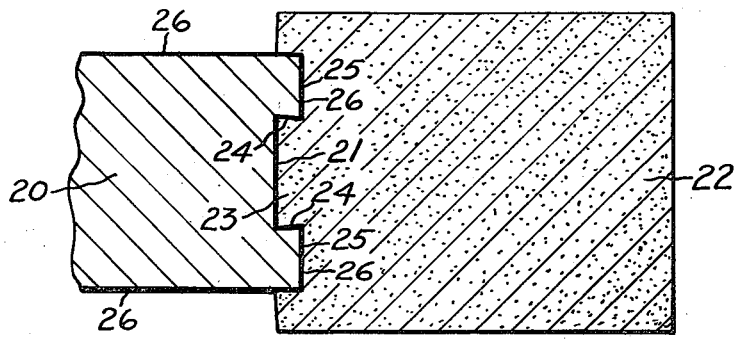
Figure 2:
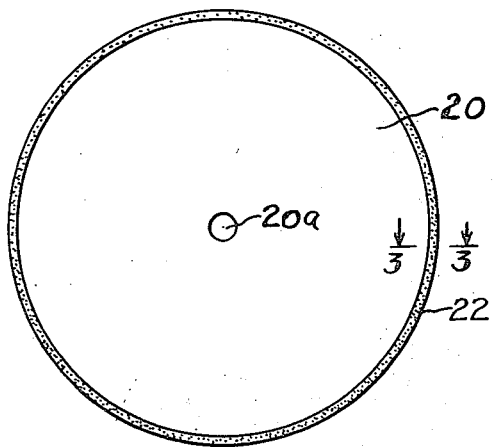

In the accompanying drawings illustrating a wheel according to the invention and the manner of its manufacture, Figure 1 is a cross sectional view of part of a mold showing how the metal-diamond mixture is pressed onto the periphery of a metal disc which will form the wheel center, Figure 2 is an elevation of a diamond cut-off wheel, Figure 3 is a sectional view on a greatly enlarged scale taken on the line 3—3 of Figure 2.

Referring to Figure 1, I provide a mold bottom plate 10, a mold top plate 11, a lower mold band 12 and an upper mold band 13. The mold plates are metal discs having, however, central holes to receive a bolt 14 on which is a nut 15 in order to clamp the bottom plate and the top plate together, the bolt head 16 and the nut 15 fitting in counterbores 17 and 18 in the plates 10 and 11 respectively.

The mold bands are rings rectangular in cross section. It will be seen that the lower mold band 12 has a greater inside diameter than the upper mold band 13; the mold band 12 has a press fit on the periphery of the bottom plate 10 and the mold band 13 has a press fit on the top plate 11 wherefor the plates 10 and 11 are of different outside diameters as is clearly seen. The upper face of the mold plate 10 has an annular relief 19 from the periphery inwardly.

For the manufacture of a wheel according to the invention I provide a metal center 20 with a central hole 20a and the shape of the periphery of this metal center is particularly the concern of the present invention. Referring to Figure 2, the otherwise cylindrical periphery of the center 20 has a peripheral groove 21 therein which can be anything from straight sided to under cut to the extent of up to four thousandths for each ten thousandths depth of groove. Thousandth herein means thousandths of an inch and is a convenient unit for describing the shape of the peripheral portion of the wheel. The bottom of the groove 21 is preferably a cylindrical surface but not necessarily so.

Referring now to Figure 1, I first assemble the mold parts about as shown therein excepting that the upper mold band is not in place. I then fill the space between the plate 11, center 20, plate 10 and band 12, with a mixture of metal powder and diamond grit. Many formulae for such mixtures are known. In industry the usual concentration of diamond grit, meaning its percentage by volume, is any of 6.25% or 12.5% or 25% and variations have occurred. There is nothing critical in any of these figures and the use of only three concentrations is merely a commercial convenience. Grit sizes of the diamond in a large majority of diamond abrasive products varies from 24 grit size to 100 grit size but this is not germane to the invention either.

Having filled the mold, I place the band 13 in position and then insert it in an hydraulic press and close the mold to move the bottom of the mold band 12 to the level of the bottom of the plate 10. The mold is then opened (the bands are removed by the aid of a press) and the wheel is taken to a furnace to sinter the metal powder or powders, all as very well known in the art. This produces a sintered metal bonded diamond abrasive annulus 22 on the periphery of the center 20.

Prior to the pressing operation I preferably plate the periphery and also the sides adjacent the periphery of the center 20. When the bond for the annulus 22 is a bronze bond I plate the center with copper and with tin. I usually plate with copper first and I like to plate the entire area of the sides of the center as this gives the finished article an attractive appearance. The copper and tin platings sinter as the annulus sinters and produce a homogeneous bronze coating on the center. The bronze bond of the annulus adheres very strongly to the sintered plating on the center. It can easily be proved that the sintering of the two platings produces a single alloy plating because, with the tin plating on top of the copper plating, the center is silver color but after sintering it is golden bronze in color.

Any bronze bond can be used in the preferred form of the invention. Usually the bronze is developed in the sintering operation, that is to say a mixture of copper and tin powders are used instead of a bronze powder. Proportions of 90Cu10Sn, 81.4Cu18.6Sn have had large commercial use. Nickel may be included and in fact any alloy the major part of which is copper and which is recognized as a bronze can be used. All proportions referred to herein are by weight. If the bronze is a copper tin bronze as is preferred the proportion of tin should be at least 5% and not more than 35%.

Before the groove 21 was provided in the manufacture of diamond cut-off wheels the rejections were more than could be desired and there were too many failures in use. I believe this was because, during the pressing operation, the diamond abrasive ground off the plating at least on the upper part of the periphery of the center 20. Furthermore when the molding pressure is released, this pressure being customarily over ten tons to the square inch, there is an inherent spring-back in the powders which causes a movement of the press powders across the face of the steel. This movement is greater as the wheel thickness is increased. This spring-back movement, before the present invention, weakened the joint strength.

Provision of the groove as defined has eliminated these defects. The compressed mixture forming the inwardly projecting portion 23 cannot spring back as it is confined between the annular shoulders 24. Furthermore these shoulders and the groove 21 considerably reduce the wiping action of the diamond abrasive as the flow of the powders is no longer parallel to the face of the bottom of the groove 21 and in fact the provision of the groove 21 causes the flow of the powders to be quite irregular. At all events great improvements in actual practice have been obtained by grooving the periphery of the center 20 as herein explained. Highly beneficial results according to the invention are obtained if the width of the groove 21 is at least as great as the average of the upper and lower cylindrical portions 25 outside of it but preferably it is somewhat wider as shown.

The annular shoulders or sides 24 of the groove 21 having a reentrant taper but this is slight, as shown, and at the greatest should be no more than four units taper in ten units depth. The portion 23 can be called a dovetail but the taper of the sides is slight as defined in connection with the groove 21. Greater tapers are to be avoided as they do not give as good results although the reason is not clear. The sides 24 though illustratively conical surfaces don't have to be such nor cylindrical. Provided the average of undercut taper, if any, is no greater than four in ten, the sides can be irregular surfaces. It is surprising that more pronounced dovetails do not give as strong a union between the center 20 and the diamond abrasive annulus but such is the case based upon my experience.

Solely to illustrate the invention I have made wheels according to the following specifications:

| | |
|---|---|
| Thickness of center at periphery | 90 thousandths. |
| Thickness of center at hole 20a | 90 thousandths. |
| Diameter of center | 13.754 inches. |
| Material | Oil hardened tool steel. |
| Radial outside dimension of annulus | 156 thousandths. |
| Width of annulus | 130 thousandths. |
| Depth of groove 21 | 10 thousandths. |
| Taper of groove 21 | One-half thousandth. |
| Grit size of diamonds | 36. |
| Concentration of diamonds | 12.5%. |
| Bond | 81.4Cu18.6Sn. |
| Plating | Electroplated tin over electroplated copper. |

Wheels so made were superior diamond cut-off wheels and were sold to customers in the regular course of business with satisfaction of the customers.

With regard to the thickness of the plating 26 each layer can vary within wide limits. Fifty molecules thick is sufficient for good results and the maximum thickness is that beyond which the two metals will not sinter together to form a homogeneous alloy, e. g. bronze. It will suffice if only the periphery of the center is plated, but I prefer to plate the sides at least under the annulus 22.

It will thus be seen that there has been provided by this invention is diamond cut-off wheel in which the various objects hereinbefore set forth together with many thoroughly practical advantages are successfully achieved. As various possible embodiments may be made of the above invention and as many changes might be made in the embodiment above set forth, it is to be understood that all matter hereinbefore set forth or shown in the accompanying drawings is to be interpreted as illustrative and not in a limited sense.

I claim:

1. A diamond cut-off wheel comprising a circular metal center having a periphery which comprises two cylindrical portions and a peripheral groove, said cylindrical portions being outside of said peripheral groove and merging with the sides of the metal center, the sides of said groove being between the limits of straight sided to undercut to the extent of up to four units for each ten units depth of groove, a homogeneous plating of bronze at least 50 molecules thick on the entire periphery of the metal center including the two cylindrical portions and all of the groove and a sintered bronze bonded diamond abrasive annulus sintered to the bronze plating on the entire periphery of the metal center including the two cylindrical portions and all of the groove, said sintered bronze bonded diamond abrasive annulus forming the periphery of the wheel and having an inwardly extending portion in said groove sintered to the bottom and sides of the groove.

2. A diamond cut-off wheel according to claim 1 in which the sintered bronze bonded diamond abrasive annulus extends over the sides of the center and said sides of the center are plated with said bronze at least 50 molecules thick under said annulus and said annulus over the sides of the center is sintered to said bronze plated on said sides of the center.

References Cited in the file of this patent

UNITED STATES PATENTS

| | | |
|---|---|---|
| 2,020,117 | Johnston | Nov. 5, 1935 |
| 2,069,788 | Van Der Pyl | Feb. 9, 1937 |
| 2,072,051 | Van Der Pyl | Feb. 23, 1937 |
| 2,082,150 | Coffman | June 1, 1937 |
| 2,238,351 | Van Der Pyl | Apr. 15, 1941 |
| 2,334,048 | Van Der Pyl | Nov. 9, 1943 |
| 2,506,556 | Ball et al. | May 2, 1950 |
| 2,609,285 | Thomas | Sept. 2, 1952 |